US012530370B2

(12) United States Patent
Dai et al.

(10) Patent No.: US 12,530,370 B2
(45) Date of Patent: Jan. 20, 2026

(54) INCREASING FAULT TOLERANCE IN A MULTI-NODE REPLICATION SYSTEM

(71) Applicant: Microsoft Technology Licensing, LLC, Redmond, WA (US)

(72) Inventors: Ji Dai, Shanghai (CN); Xin Zhang, Shanghai (CN); Vadim Makhervaks, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 30 days.

(21) Appl. No.: 18/478,633

(22) Filed: Sep. 29, 2023

(65) Prior Publication Data

US 2025/0036651 A1 Jan. 30, 2025

Related U.S. Application Data

(60) Provisional application No. 63/515,627, filed on Jul. 26, 2023.

(51) Int. Cl.
*G06F 16/27* (2019.01)
*G06F 16/23* (2019.01)

(52) U.S. Cl.
CPC ......... *G06F 16/27* (2019.01); *G06F 16/2379* (2019.01)

(58) Field of Classification Search
CPC .. G06F 16/27; G06F 16/2379; G06F 11/1612; G06F 11/1446
See application file for complete search history.

(56) References Cited

U.S. PATENT DOCUMENTS 7,805,407 B1 * 9/2010 Verbeke .............. G06F 11/2097
707/634
10,592,342 B1 * 3/2020 Sokolova ............ G06F 11/1425
(Continued)

FOREIGN PATENT DOCUMENTS

CN 112202834 A 1/2021
CN 113886129 A 8/2024

OTHER PUBLICATIONS

Ongaro, Diego, "Consensus: Bridging Theory and Practice", In Thesis of Stanford University, Aug. 2014, 258 Pages.
(Continued)

*Primary Examiner* — Robert W Beausoliel, Jr.
*Assistant Examiner* — Mohammad S Bhuyan
(74) *Attorney, Agent, or Firm* — Holzer Patel Drennan

(57) ABSTRACT

The disclosed technology includes fault-tolerant data replication system implemented by a cluster of compute devices. The system includes a witness comprising persistent data storage and multiple nodes configured to selectively execute leader node operations when serving as a leader of the cluster. The leader node operations include detecting an availability status change for a follower node of the cluster and, in response, updating a subterm and a replication set. The subterm identifies a total number of availability status changes detected within the cluster over a given time interval, and the replication set identifies set of entities designated to provide acknowledgments counted when determining whether to commit a message following message replication. The leader node operations further include writing the replication set, the subterm, and other metadata to the witness in response to receiving a first client message from a client application following the availability status change.

20 Claims, 8 Drawing Sheets

(56) References Cited

U.S. PATENT DOCUMENTS

| | | | |
|---|---|---|---|
| 11,671,488 B1 | 6/2023 | Sharma et al. | |
| 2012/0254342 A1* | 10/2012 | Evans | G06F 11/2064 |
| | | | 709/214 |
| 2013/0290249 A1* | 10/2013 | Merriman | G06F 16/278 |
| | | | 707/610 |
| 2016/0253249 A1 | 9/2016 | Tang et al. | |
| 2017/0123945 A1* | 5/2017 | Panasko | G06F 11/2094 |
| 2017/0270176 A1 | 9/2017 | Horowitz et al. | |
| 2018/0322157 A1 | 11/2018 | Lee et al. | |
| 2019/0146884 A1* | 5/2019 | Gangadharappa | G06F 11/2094 |
| | | | 711/162 |
| 2020/0026446 A1 | 1/2020 | Jawahar et al. | |
| 2022/0206900 A1 | 6/2022 | Zad Tootaghaj | |
| 2022/0286378 A1 | 9/2022 | Rossie, Jr. | |
| 2022/0358118 A1 | 11/2022 | Paluch et al. | |

OTHER PUBLICATIONS

Pâris, et al., "Pirogue, a lighter dynamic version of the Raft distributed consensus algorithm", In Proceedings of IEEE 34th International Performance Computing and Communications Conference (IPCCC), Dec. 14, 2015, 8 Pages.

Yuchen, et al., "Dragonboat—A Multi-Group Raft library in Go", Retrieved from: https://github.com/lni/dragonboat, Jun. 14, 2023, 7 Pages.

International Search Report and Written Opinion received for PCT Application No. PCT/US2024/036475, Oct. 8, 2024, 16 pages.

Kim, et al., "High Availability in Cheap Distributed Key Value Storage", Proceedings of the 11th ACM Symposium on Cloud Computing, ACMPUB27, New York, NY, USA, Oct. 12, 2020, pp. 165-178.

* cited by examiner

INCREASING FAULT TOLERANCE IN A MULTI-NODE REPLICATION SYSTEM

CROSS-REFERENCE TO RELATED APPLICATIONS

The present application claims the benefit of priority to U.S. provisional patent application Ser. No. 63/515,627, entitled "Increasing Fault Tolerance in a Multi-Node Replication System" and filed on Jul. 26, 2023, which is hereby incorporated by reference for all that it discloses or teaches.

BACKGROUND

A multi-node data replication system supports replication of state machine data at each of multiple server nodes in a server node cluster. In one example use case, a cloud-based resource provider implements a multi-node replication system to provide redundancy and fault tolerance for client applications executing on cloud servers. If a client application is executing on a server node that is part of a cluster implementing a sufficiently fault-tolerant multi-node data replication algorithm, then the server node can fail and any client applications executing on the server node at the time of failure can be quickly relaunched on another server node in the cluster—typically, without losing client data and also without significantly extending the time that it takes for the client application to successfully execute to completion.

A variety of different consensus algorithms are employed to achieve multi-node replication of state machine data. Common objectives of these algorithms include ensuring consensus on a data value that is transmitted to multiple nodes, mechanisms for self-correcting data records when update errors do occur, and safeguards to ensure that an active process is never transferred to and/or resumed by a node lacking a most-up-to-date record of the associated process data.

SUMMARY

According to one implementation, a fault-tolerant method is disclosed for replicating data from a client application in a cluster of compute devices. The fault-tolerant method includes updating a subterm and a replication set in response to detecting an availability status change for a follower node within the cluster of compute devices. The subterm identifies a total number of availability status changes detected within the cluster of compute devices over a given time interval and the replication set identifies a set of entities that are designated to provide acknowledgments that are counted when determining whether to commit a received message. The update to the replication set includes removing the first follower node from the replication set and adding a witness to the replication set. The method further includes writing data to the witness in response to receiving a first client message from a client application following the availability status change. The data written to the witness includes the replication set, the subterm, and a term identifying a number of times a new leader has been elected over the given time interval.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Other implementations are also described and recited herein.

DETAILED DESCRIPTION

Figure 1:
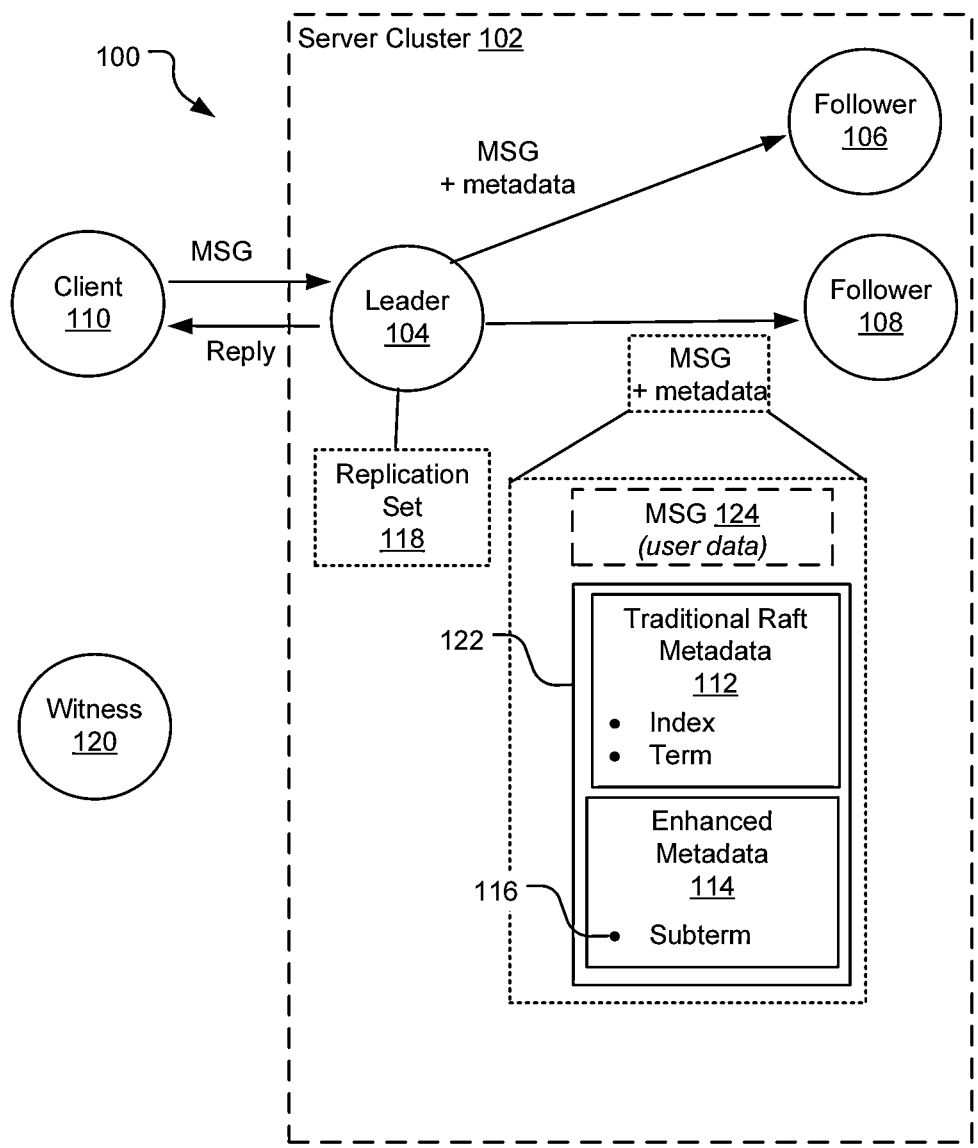
FIG. 1 illustrates aspects of an example multi-node state machine replication system implementing the disclosed technology.

Various multi-node systems deploy different consensus algorithms for replicating state machine data. In one popular consensus algorithm, known as "Raft," a one node serves as a cluster while all other nodes in the cluster serve as followers. The leader node manages communications to and from a client device and replicates each incoming client message along with certain metadata to all followers. Upon receipt of each replicated message from the leader node, each follower node responds with an acknowledgment. The leader node "commits" the message once the message has been acknowledged by a quorum of the total number of cluster nodes. As used herein, a message is said to be "committed" by executing the commands included in the message. During this process of message committal, the leader node's own acknowledgement can be used to achieve the quorum needed to commit the message. This quorum requirement ensures that at least a majority of system nodes always have the most up-to-date data while also increasing fault tolerance in proportion to cluster size. For example, in three-node system where the quorum is two, the above-described quorum requirement ensures that at least two nodes always have the most current data entry so a single node can fail while ensuring that at least one of the remaining (non-failed) nodes have the most current data. Likewise, a five-node system is fault tolerant up to two failed nodes, and a seven-node system is fault tolerant up to three failed nodes. Notably, it is impossible to achieve a quorum in a two node system when one node fails because one of two nodes does not represent a "majority" in a two-node system. Therefore, while the above-described traditional form of Raft ("traditional Raft") can be implemented in a two-node system, the two-node implementation cannot tolerate even a single failure because data cannot be committed when a node failure exists. For this reason, it is impractical to use traditional Raft in a two-node system.

Traditional Raft is also problematic in even node systems with more than two nodes due to a quorum-based election process that is commenced to elect a new leader when the current leader becomes unavailable (e.g., goes offline or becomes unreachable due to network partition fault). As part of the new leader election process, the follower nodes compare their respective metadata logs to ensure that the newly elected leader is a node with a most current copy of the replicated state machine data. To be elected as a new cluster leader, a node must receive a quorum of votes of the N total nodes in the cluster. Notably, an even-vote split evenly among two or more candidates can make it impossible to achieve a quorum in an even-node system. Another related problem in traditional Raft arises in even-node clusters when a single network partition splits the cluster into two isolated node sets, neither of which is a quorum. Both of the above-described scenarios can make it impossible for the cluster to elect a leader.

While there currently exist some modifications to the traditional Raft logic that provide workarounds to quorum requirements in the above-described problematic scenarios, existing work-arounds are overhead and resource intensive. For example, one popular work-around requires recordation of large amounts of state machine data on a high-capacity resource external to the cluster. Additionally, these existing workarounds tend to introduce undesirable system latencies due to their inherent dependency on significant quantities of communications with resource(s) external to the cluster. If, for example, these external resource(s) have performance characteristics inferior to those of the nodes within the cluster, communications with the external resource(s) can serve as a "bottleneck" for entire cluster.

The herein disclosed technology includes a multi-node state machine replication system that implements consensus logic effective to increase fault tolerance within a Raft cluster as compared to traditional applications of Raft in identically-sized clusters. This increased fault tolerance is achieved without writing significant amounts of data to any resource external to the server cluster and also without requiring significant I/O with respect to cluster-external resources, which can undesirably invite latencies (e.g., bottlenecking) as described above. Advantageously, the herein disclosed multi-node state machine replication system can be implemented in a server cluster with any number of nodes, including two-node systems and systems with higher-numbered even node systems. This provides fault-tolerant state machine data replication in two-node clusters (which is useful for cloud customers that do not want to configure or pay for a third node) and also allows for clusters to be increased in sized in in single node increments without having to change parameters and/or logic of the consensus algorithm.

FIG. 1 illustrates aspects of an example multi-node state machine replication system implementing the disclosed technology. The multi-node state machine replication system 100 implements a consensus algorithm similar to the traditional Raft algorithm that is referred to herein as the "disclosed consensus algorithm." The disclosed consensus algorithm offers a number of novel improvements over traditional forms of Raft that allow it to be implemented in two-node clusters and even-node clusters without observable performance degradation.

The multi-node state machine replication system 100 includes a client 110 that communicates data and messages to a cluster 102 that is formed by two or more nodes (e.g., servers) and a witness 120. In the illustrated example, the cluster 102 includes three nodes: a leader 102 and two followers 106 and 108. As used herein, the term "node" refers to an entity in a cluster that includes executable logic (e.g., code executed by servers in a cluster). In contrast, the term "witness" refers to an entity in the cluster that has data persistent data functionality. In one implementation, the witness lacks dedicated compute logic (e.g., the witness does not need to be on a dedicated server) and serves exclusively as a storage destination for read-modify-write operations of the nodes (e.g., servers) within the cluster. In FIG. 1, the witness 120 is not stored on any of the nodes (e.g., servers) of the cluster 102. For example, the witness 120 resides in a shared storage location and on a resource that can be simultaneously accessed by multiple users and/or data systems. The witness 120 is, for example, in a shared storage location on any server message block (SMB) device or network file system (NFS) or cloud storage location (e.g., Microsoft's Azure Blob Storage). In one implementation, the shared storage location is configured to support atomic creation of hard links—meaning, the shared storage location is read from and updated atomically (e.g., guaranteed to occur without interrupt).

In FIG. 1, the three nodes of the cluster 102 (e.g., 104, 106, and 108) are communicatively coupled to one another and also to the witness 120 across a network, which may be a local area network, such as when the nodes physically reside in a same data center or small area, or a wide area network (e.g., the internet), such as when the two or more cluster nodes physically reside at geographically remote locations.

Each of the nodes in the cluster 102 is configured to selectively serve as either a leader node (e.g., the leader 104) or a follower node (e.g., the followers 106, 108). At each point in time, exactly one node of the cluster 102 serves the role of the leader 104 and all other nodes in the cluster 102 concurrently serve as follower nodes. The leader 104 executes a set of operations referred to herein as "leader node operations" while each of the followers 106, 108 executes certain "follower node operations," both of which are described in greater detail below. Notably, certain types of events within the cluster 102 can trigger an election process effective to potentially promote a new leader and to demote the former leader to that of a follower. Example election process operations are discussed at least with respect to FIG. 4A-4B below.

The cluster 102 is tasked with replicating sequentially-received data that is provided to the cluster 102 by the client device 110. This sequentially-received data from the client device 110 is also referred to herein as state machine data, as it includes messages from the client device 110 that each constitute a different state that is to be copied from the leader 104 to the followers 106, 108 is the same order as which the messages are received.

The data transmitted to the cluster 102 is received in units referred to herein as messages ("MSG"). Upon receipt of each message (e.g., a MSG 124) from the client device 110, the leader 104 updates certain locally-stored variables 118 including a term, a subterm, and replication set, all of which are discussed in greater detail below. After updating the locally-stored variables 118, the leader 104 then retransmits the message 124 to each of the follower nodes 106, 108 in the cluster 102. The transmitted message is packaged with certain metadata 122 that includes some of the locally-stored variables 118.

The leader node 104 does not commit the message 124 (e.g., execute commands included within the message) until the message 124 is acknowledged by a predefined sufficient number of the follower nodes. In traditional Raft applications, the leader commits a message once it has been acknowledged by a quorum of the total system nodes, and leader is itself counted when determining whether the quorum requirement is satisfied. However, in the disclosed consensus algorithm logic, the leader node 104 is permitted to commit a message that has been acknowledged by one fewer than a quorum (quorum-1) of the total entities in the cluster 102 when one of the cluster nodes is unavailable to participate in the acknowledgement process, provided certain other requirements (discussed below) are met. As used herein, "entities" in the cluster 102 include both the nodes and the witness, and the term "quorum" refers to a smallest integer "q" such that 2*q is greater that a quantity Size (cluster), where Size(cluster) is a total number of entities in the cluster. In the example shown where the cluster includes three nodes and a witness, the Size(cluster) is four, the quorum is three.

The metadata 122 that is transmitted along with each replicated message (e.g., the message 124) includes two types of metadata—traditional Raft metadata 112 and enhanced metadata 114. The traditional Raft metadata 112 includes an index, which serves as a timestamp that increments with each new message that is received and replicated. Additionally, the traditional Raft metadata 112 includes a variable referred to as "term" that is incremented each time the cluster 102 elects a new leader (this term is the same term that is stored among the locally-stored variables 118 of the leader 104).

New leader election occurs when the current leader becomes unavailable to other nodes within the cluster, such as when the leader goes down (offline) or becomes unreachable due to a network partition fault, which is a failure that causes the nodes to effectively split into multiple groups such that all nodes may remain functional (online) but be unable to communicate with the nodes in other groups. Examples of leader election are further discussed below with respect to at least FIG. 4A-4B.

In addition to the above-described traditional Raft metadata 112, the metadata 122 includes enhanced metadata 114 including a subterm 116, which is not utilized in traditional Raft applications. Notably, the current value of the subterm 116 is maintained at all times by the leader 104 as one of the locally-stored variables 118. The subterm 116 is an index indicating a number of node availability status changes observed over a given interval, such as within the present term. As used herein, the "node availability status" indicates whether a node is available. In the following description, a node is said to be "available" when it is online and able to receive messages from the leader node 104. The leader node 104 increments the subterm 116 when, for example, the follower node 106 goes offline and increments the subterm 116 again when the follower node 106 returns online.

In addition to the index, term, and subterm (described above), the locally-stored variables 118 of the leader 104 further include a replication set 119. The replication set 119 is the sole variable of the locally-stored variables 118 that is not included in the metadata 122 transmitted to the followers 106, 108 along with each replicated message. The replication set 119 is an entity set of fixed size M, where M is the number of nodes in a cluster, that includes the "voters" of the cluster 102—meaning, these are the entities that collectively provide the votes counted in vote-based operations of the system 100.

In one implementation, the system 100 employs vote-based operations pertaining to committing messages and new leader election. The leader node 104 constructs and modifies the replication set 119 on a regular basis, such that the replication set 119 includes the available nodes and excludes nodes that are not available. The replication set 119 is conditionally transmitted to the witness 120 during writes that satisfy certain criteria, as is discussed in further detail below.

In a scenario where all nodes in the cluster 102 are online and available to receive messages from the leader node 104, the replication set 119 includes the leader node 104 and the follower nodes 106, 108. In scenarios where one of the nodes in the cluster 102 is detected as unavailable (e.g., to receive and acknowledge messages), the unavailable node is removed from the replication set 119 and the witness 120 is added. In this latter scenario, the inclusion of the witness 120 in the replication set 119 functions as a single acknowledgement that may count toward reaching a predefined threshold of acknowledgments that the leader needs to commit a replicated message.

Upon receipt of a message 124 from the client device 110, the leader node 104 updates the index, and associates the message 124 with the updated index as well as the term and the subterm 116 that are currently among the locally-stored variables 118 stored by the leader node 104. The leader node 104 then transmits the message 124 (e.g., the user data) along with a new metadata log entry (e.g., the metadata 122) including the index, the term, the subterm 116.

In some limited instances of message replication, the leader node 104 additionally transmits certain information to the witness 120 including current term, subterm 116 and replication set 119. Notably, the witness 120 does not receive the message 124 (the user data). Therefore, in these scenarios, the witness 120 receives a total quantity of data that is significantly smaller than the total data in the message 124 itself. In one implementation, the witness 120 does not receive messages or metadata entries at times that it is excluded from the replication set 119.

As will become apparent from the following detailed examples, the selective transmission of certain metadata information (e.g., the subterm 116 and replication set 119) to a shared storage location (e.g., the witness 120) provides the system 100 with the fault tolerance of a traditional Raft cluster that includes one additional server. Essentially, this means that the cluster 102 with M servers can survive one additional server failure as compared to a traditional Raft cluster with M servers. This improvement over traditional Raft applications makes it possible to configure two-node clusters in a fault-tolerant manner while also reducing hardware overhead in clusters of larger size without significantly increase I/O overhead, without altering algorithm parameters, and without imparting latencies noticeable to the end user.

Figure 2:
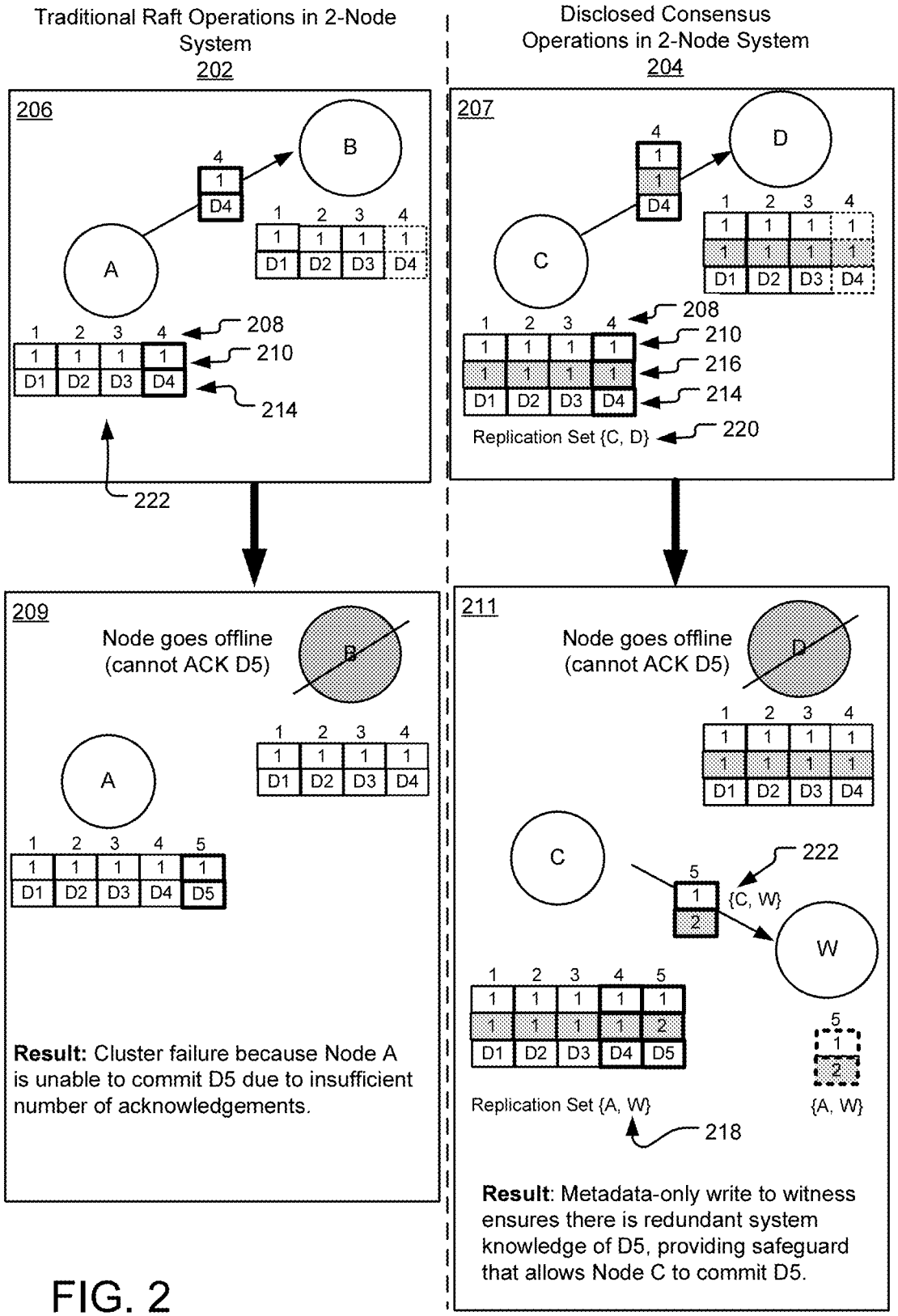
FIG. 2 illustrates side-by-side message replication operations in a first two-node cluster implementing traditional Raft logic and in a second two-node cluster implementing the disclosed technology.

FIG. 2 illustrates side-by-side message operations 202, 204 in a first two-node cluster implementing traditional Raft logic (at left) and in a second two-node cluster implementing the herein-disclosed consensus algorithm logic (at right). The side-by-side message operations 202, 204 illustrate a key reason that traditional Raft logic fails in a two-node cluster and the disclosed consensus algorithm logic succeeds.

Both sets of the operations 202, 204 pertain to a scenario where the cluster leader node has just received a new client message "D4" and is in the process of replicating the message D4 to a follower node. In the cluster implementing traditional Raft (at left), the leader node is A and the follower node is B. In the cluster implementing the disclosed consensus algorithm logic (at right), the leader node is C and the follower node is D.

With reference first to the traditional Raft logic shown in view 206 (top left), the leader node A receives a message, replicates the message, and waits for an acknowledgement. The leader node A maintains a metadata log with entries associated with each of multiple messages 214 received from a client device (not shown). In this example, D1, D2, and D3 are messages previously received and successfully replicated at the follower node B. When the leader node A receives the message D4, the leader node A adds an entry to its metadata log that includes a current value for an index 208 and a term 210, where the index and term are defined as generally described with respect to FIG. 1. The leader node A transmits the newly-received message D4 to the sole follower node B, along with the metadata log entry indicating the current value of the index 208 and term 210 (index=4, term=1). Following receipt of this information, the follower node updates its own metadata log to match the received metadata (index=4, term=1), and transmits an acknowledgment (not shown) to the leader node A.

With reference now to the disclosed consensus algorithm logic shown in view 207 (top right), the cluster differs in that it includes an additional entity—a witness W—in addition to a leader node C and a follower node D. Here, the replication actions differ in that the leader node C locally maintains a subterm 216 and a replication set 220 in addition to the term 210 and the index 208. The subterm 216 indicates a number of node availability status changes observed within the cluster over a given interval, such as in the current term with same leader. Here, the subterm is also 1, meaning that both of the cluster nodes C and D have been online and available since the beginning of the given interval.

The replication set 220 includes a set of entities that are, at a given point in time, designated to provide votes in vote-based operations, such as in new leader elections and to provide the acknowledgments ("votes") for committing a message following replication. In one implementation, the replication set 220 is required to include the leader node and have a fixed size (N) that equals a total number of nodes in the cluster.

In the example illustrated by the view 207, the replication set 220 is {C, D} at times when the leader node C and the follower node D are both online and able to communicate. In this scenario where the witness W is not included in the replication set 220, message committal by the leader node C is the same as traditional Raft. That is, the message D4 is committed when the leader node C confirms it has been acknowledged by a quorum of all entities in the cluster. In this case, the cluster does include an additional entity, but this does not impact the outcome in this case because a quorum of 3 entities is 2 and a quorum of 2 entities is also 2.

When the leader node C transmits the new message D4 to the follower node D, the message D4 is transmitted along with all of the associated metadata—e.g., the index (4), the term (1), the subterm (1) and the message itself (D4). The follower node D replicates the received metadata log entry and sends an acknowledgement (not shown) to the leader node C. In determining when to commit the message D4, the leader node C counts its own vote and also counts the acknowledgment from the follower node D as a vote. Here, these two 2 votes collectively provide a quorum of all three entities in the cluster. Consequently, the leader node C is able to commit the message D4.

Referring now back to the traditional Raft applications (at left), a view 209 illustrates an example scenario potentially following that discussed with respect to the view 206. Here, the leader node A determines that the follower node has gone offline. Subsequently, the leader node A receives another message, D5, from the client device. In order to commit the message D5, the leader node A is required to replicate the message to all follower nodes and confirm that at least a quorum of the total nodes in the cluster have received the message. The leader node A counts itself toward this quorum (e.g., because it can confirm that it did in fact receive the message D4) but needs to receive an acknowledgement from the follower node B before being permitted to commit the message and execute any commands in the message. Since the follower node B is offline, the leader node A is unable to commit the message. In this scenario, the cluster fails (e.g., experiences system error that prevents further user data replication) because the leader node A is not able to confirm that at least a quorum of the cluster nodes have received the message.

Notably, the above-described quorum requirement for message committal ensures that leader does not execute client commands in scenarios where there the leader node is the only node with knowledge of the commands being received and executed (as in the scenario illustrated in view 209). If not for this quorum requirement, client data could potentially be lost when a leader node commits a message and then goes offline due to fault scenario. If, for example, the leader node A were to commit the message D5 and then drop offline, the message D5 would be lost in the event that the follower node B returned to an online state and resumed the leader role.

In contrast to the failure scenario shown in the view 209, a view 211 (bottom right) illustrates operations of the disclosed consensus algorithm logic that are performed in the circumstances described with respect to traditional Raft logic and the view 209. Here, the leader node C detects that the follower node D has gone offline. In response, leader node C updates an index of the subterm 216 from 1 to 2. Additionally, the leader node 204 removes the offline node (D) from the replication set and adds a witness (W), creating updated replication set 218 {C, W}. When the next message D5 is subsequently received at the leader node C, the leader node C associates the new message D5 with a metadata log entry 222 that includes the current index (5), the current term (1), and the updated subterm value (2).

At the replication stage for the message D5, the follower node D is offline and so there are no remaining online follower nodes to receive the message D5. In this case, the leader node C transmits the metadata log entry and the replication set 218 to the witness W. Specifically, the replication set is transmitted to the witness when the leader node C determines that all of the following are true: (1) the leader has just entered a new subterm (e.g., this is the first message of the new subterm); (2) the current replication set includes the witness; and (3) the leader already received at least a quorum-1 acknowledgements from the entities in the current replication set.

The witness W receives the updated replication set 218 {C, W} and the metadata log entry (e.g., index=5, term=1, subterm==2) associated with the new message D5. Notably, the witness W does not receive the message D5 itself. The successful write to the witness W allows the leader node C to commit the message because this write provides the system with an additional fault (e.g., storing data that is only replicated on the leader node C), allowing the system to survive in the event that the leader node C were to go offline. Assume, for example, that the leader node C goes down and the follower node D comes back online just shortly after. In this case, the metadata log entry 222 stored on the witness can be compared to the newest metadata log entry (e.g., with index 4) stored on the follower node D, and the follower node D can determine that the leader node C is storing some data that the follower node D has not yet received. In this case, the cluster can elect to wait for the original cluster leader to return to the online state rather than elect a new leader, and no client data is lost.

As illustrated by the above example, the recordation of the metadata log entry 222 on the witness provides a safeguard that can subsequently inform other nodes in the cluster of the existence of the message D5. Consequently, the leader node C is—in the above-described scenario—permitted to commit the message D5 in response to confirming that the message has been received by a quorum-1 of the entities in the replication set (as compared to requiring a quorum of the cluster entities, as in the traditional Raft application). In the example of view 211, the leader node C is able to commit the message D5 because the leader node C can confirm it received the message (satisfying the quorum-1 requisite confirmations) and also because the leader node C is able to confirm that it successfully wrote the updated replication set 220 and the metadata log entry 222 including the corresponding subterm to the witness.

FIGS. 3A-3E illustrate example operations performed to replicate and commit a message within a cluster implementing the disclosed consensus algorithm logic. The example cluster includes two nodes 302, 304 which may be understood as being different servers each configured to selectively implement the disclosed leader node operations and follower node operations. A witness 306 is also communicatively coupled to the nodes 302, 304. Unlike the nodes 302, 304, the witness 306 is not a dedicated server but instead persistent data storage residing in a shared storage location somewhere external to the nodes 302, 304.

Figure 3A:
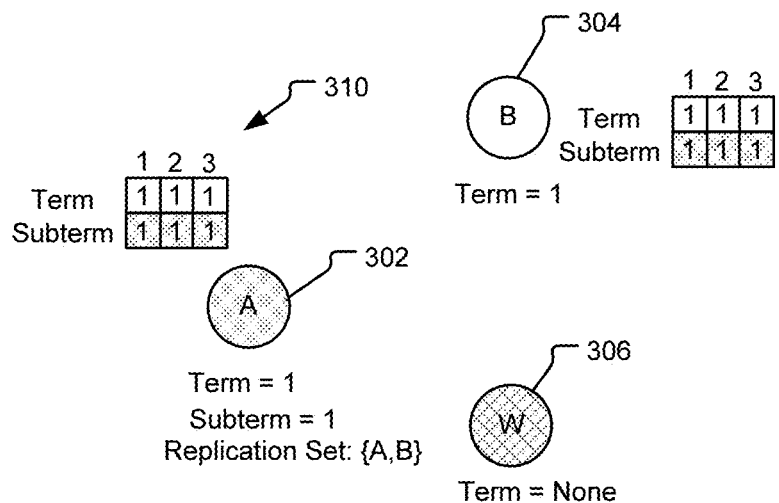
FIG. 3A illustrates a first set of example operations performed during message replication in a two-node cluster system.

FIG. 3A illustrates a first set of example operations 301 performed during message replication in a two-node cluster. The node 302 is currently serving the role of cluster leader and performs leader node operations. Specifically, the node 302 maintains local variables including a term, subterm, and replication set (all defined elsewhere herein). In response to receiving each new message from a client device (not shown), the cluster leader appends a new entry to a metadata log 310 that includes the term, subterm, and an index that corresponds to the index of the log entry. In the illustrated example, the current log entry index is 3, the term is 1 (meaning the current cluster leader was also the initial leader of the cluster), and the subterm is 1 (meaning the leader has not yet observed a node availability status change within the cluster). The replication set is an M-size set, with M being the number of server nodes in the cluster, which is 2 in the illustrated example. The replication set is initialized to include all cluster nodes as {A, B}.

Figure 3B:
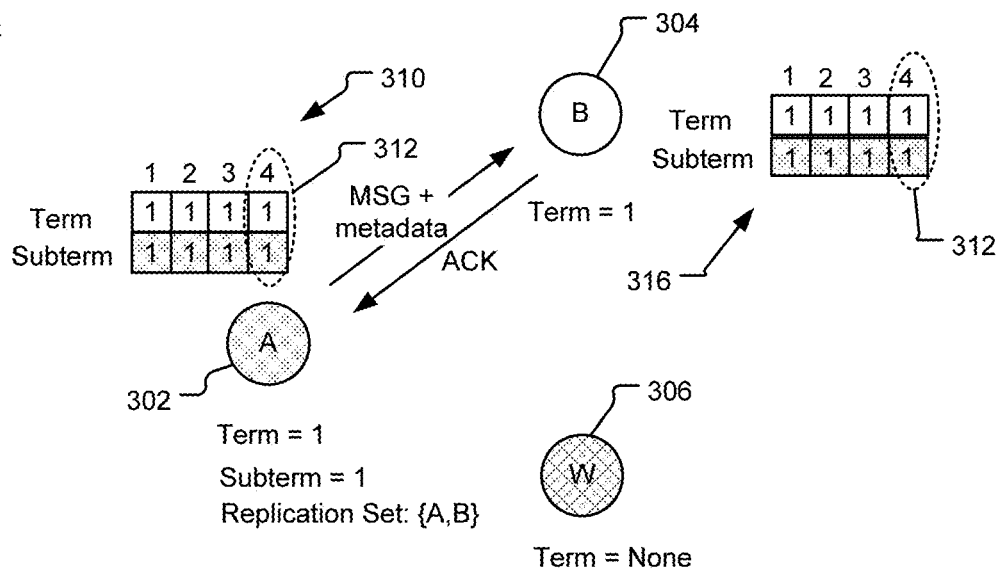
FIG. 3B illustrates example operations in a two-node cluster system following those shown in FIG. 3A.

FIG. 3B illustrates an example operation 303 following those shown in FIG. 3A. Here, a new message has been received at the node 302. In response, the node 302 has created a new entry 312 in the metadata log 310. The new entry 312 indicates the current term and subterm, which have not incremented since receipt of the previous client message. The node 302 transmits the message to the sole follower node (e.g., the node 304), and the follower node stores the message and updates its own metadata log 316 to include the new entry 312. The node 304 then transmits an acknowledgment (ACK) back to the node 302, and the node 302 commits the message in response to confirming that it has been acknowledged by a quorum of all entities in the cluster (including server nodes and the witness). In this case, the node 302 can count one acknowledgment from the node 304 and can also count itself, providing ⅔ acknowledgements (a quorum of the entities in the cluster). The node 302 is permitted to then commit the message.

Figure 3C:
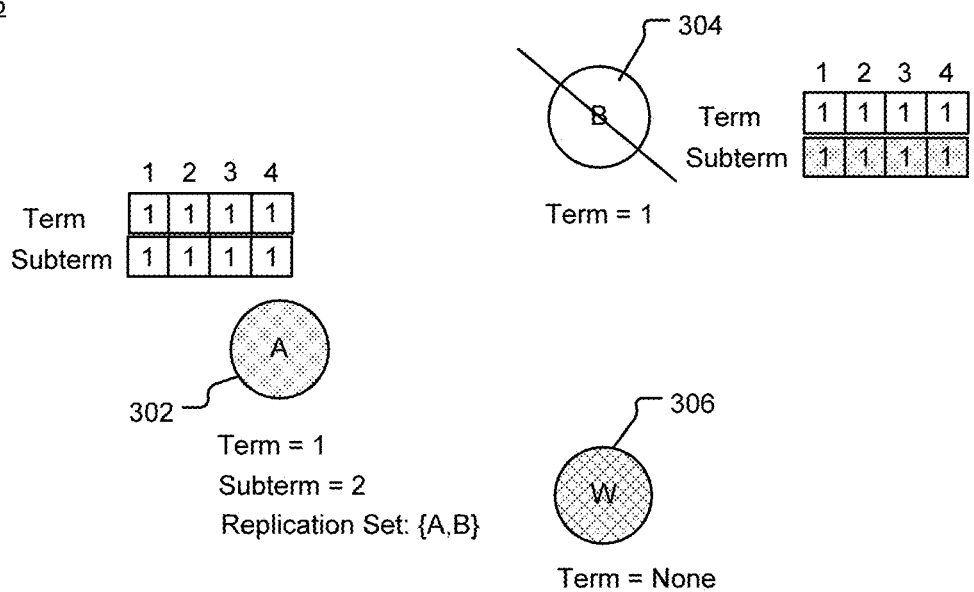
FIG. 3C illustrates additional example operations in a two-node cluster system following the operations of FIG. 3B.

FIG. 3C illustrates additional example operations 305 following the operation of FIG. 3B. Here, the node 302 (e.g., the cluster leader) detects that the node 304 (e.g., the follower node) is not available (e.g., is down and unreachable via the network). In response to this node status availability change, the node 302 updates the subterm index from 1 to 2 and also updates the replication set to remove the node 304 and to add the witness 306 (e.g., changing the replication set from {A, B} to {A, W}).

Figure 3D:
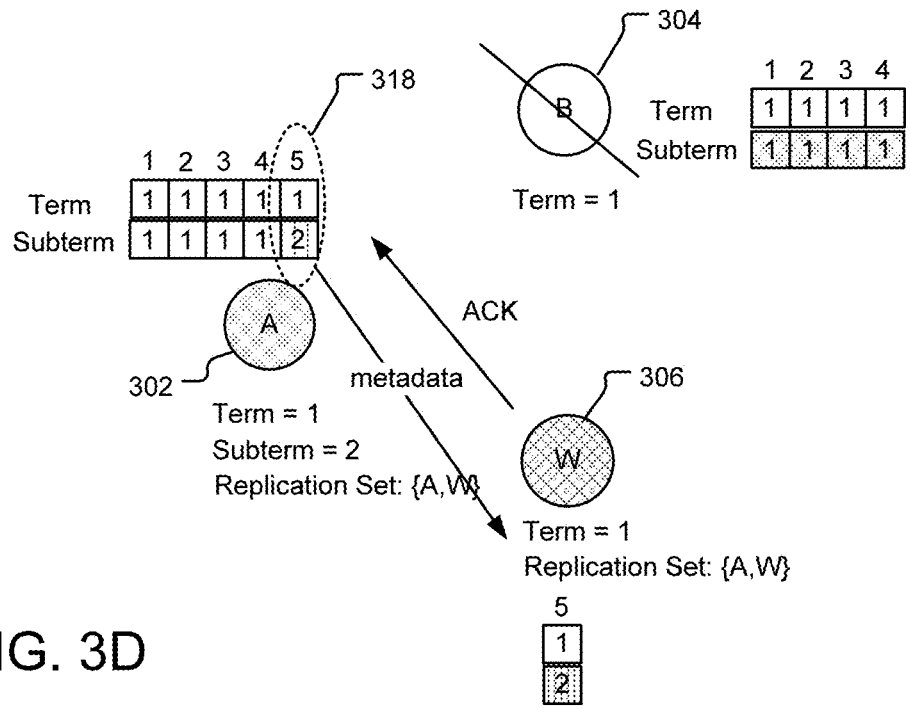
FIG. 3D illustrates additional example operations in a two-node cluster system following the operations of FIG. 3C.

FIG. 3D illustrates additional example operations 307 following those of FIG. 3C. Here, the node 302 has received a new message from the client device and, in response, creates a new metadata log entry 318 associating the new message with the new subterm (2). The node first transmits the message and metadata log entry 318 to all cluster nodes. However, in this case, node B is unable to receive or acknowledge. This is a scenario where the node 302 elects to write to the witness W (and count the witness' "vote" toward the requisite number of acknowledgements) because all of the following are true: (1) the leader has just entered a new subterm (e.g., this is the first message of the new subterm); (2) the current replication set includes the witness; and (3) the leader has received at least a quorum-1 acknowledgements from the entities in the current replication set (here, the sole counted acknowledgement that the node 302 can count is its own acknowledgment, but this provides the requisite number (e.g., quorum-1) of acknowledgements for a 3-entity cluster, and all of these received acknowledgements all come from an entity in the replication set).

The node 302 transmits the new metadata log entry 318 and the updated replication set {A, W} to the witness 306. Notably, the client message is not replicated to the witness 306 in the illustrated implementation. A successful write to the witness 306 is considered an acknowledgement from the witness 306, and the node 302 is then able commit the associated message upon confirming the write was successful.

Figure 3E:
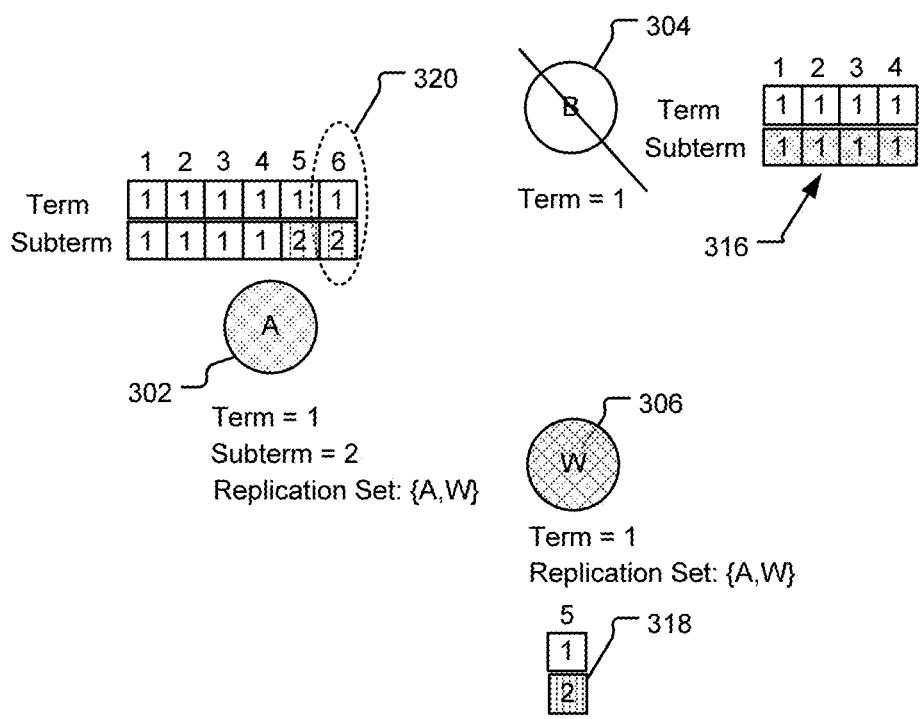
FIG. 3E illustrates additional example operations in a two-node cluster system following the operations of FIG. 3D.

FIG. 3E illustrates additional example operations 309 following those of FIG. 3D. Here, the node 302 has received another new message from the client device and, in response, creates a new metadata log entry 320 associating the new message with the current term and subterm. At this point in time, the node 304 is still down and the replication set {A, W} still includes the witness. Unlike the above-described scenario, the node 302 does not need to write to the witness 306 again to commit the message. Rather, whenever it is true that: (1) the most recent metadata log entry of the witness has the same term and same subterm as the leader; and (2) the leader has received at least a quorum-1 acknowledgements from the entities in the current replication set, a unique rule applies. Specifically, when the above (2) criteria are satisfied, the leader is permitted to commit the message directly with only a quorum-1 acknowledgements from the entities in the cluster. In this scenario, an acknowledgement is counted from the witness 306 when the node 302 (the leader) confirms that its most recent metadata log entry matches a locally-cached record that includes the metadata log entry most recently written to the witness.

Since the leader node is, as a rule, always included in the replication set, the leader node can therefore count its own vote toward this acknowledgement count and commit the message associated with the new metadata log entry 320 without transmitting either the message or metadata to any other entities within the cluster (nodes or the witness) and without waiting for any acknowledgements in return. This conditional committal on quorum-1 acknowledgments (e.g., quorum of N where N=Size(cluster)) that are each from an entity in the replication set remains in effect for all following entries on the same subterm.

In sum, the above-described committal on "quorum-1" acknowledgments from the entities in the replication is permitted when the witness is included in the replication set stored on the leader and when the term and subterm are unchanged since the leader last successfully wrote to the witness. In this scenario, the witness has knowledge of the new subterm even if the current leader goes down, and this redundant knowledge of the new subterm is used to prevent the system from electing a new leader that lacks knowledge of the new subterm and any entries associated within the subterm (e.g., entries created while the node 304 is down).

Figure 4A:
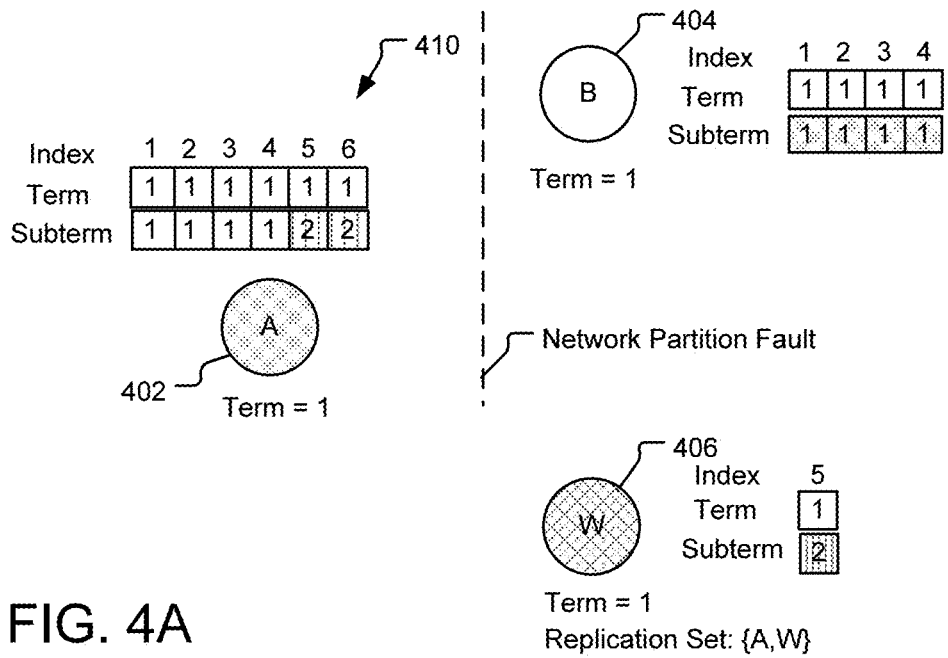
FIG. 4A illustrates a first set of example operations performed during a leader election process in a two-node system implementing the disclosed technology.
Figure 4B:
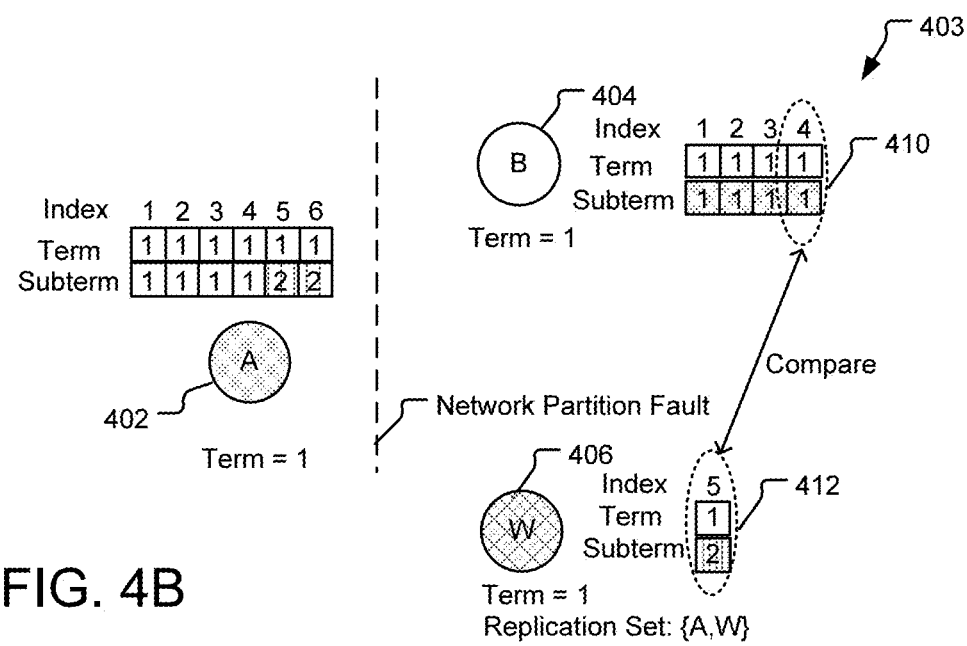
FIG. 4B illustrates another set of example operations performed during the leader election process described with respect to FIG. 4A.

FIGS. 4A through 4C illustrate a sequence of operations performed to elect a new leader within a server cluster implementing the disclosed technology. The example server cluster includes two nodes 402, 404 which may be understood as being different servers configured to selectively execute the disclosed leader node operations and follower node operations. A witness 406 is also communicatively coupled to the cluster nodes 402, 404 and has characteristics the same or similar to other witnesses disclosed herein.

FIG. 4A illustrates a first set of example operations 401 performed during leader election. In the example shown, the node 402 is serving as the leader node while the node 404 is serving as a follower node. The node 402 maintains local variables including a term, subterm, and replication set (all defined elsewhere herein). Each time the node 402 receives a new message, the node 402 creates a new entry in its metadata log 410. Consistent with the operations described with respect to FIG. 3A-3E, each new metadata new entry is transmitted to all other server nodes in the cluster.

In the example operations 401, the node 404 is returning to an online state after being offline for a period of time (e.g., such as immediately following the sequence of operations described with respect to FIG. 3A-3E). After the node 402 returns online, a network partition fault occurs before the node 402 is able to update its stored data. Due to this fault, the node 404 is unable to communicate with the node 402 (e.g., the leader's heartbeat is undetectable). Consequently, the node 404 identifies itself as a candidate to replace the former leader, and performs a set of candidate operations, described below.

FIG. 4B illustrates candidate operations 403 performed during the above-described new leader election process. In one implementation, a candidate node is elected to replace the leader of the cluster when the candidate node is able to secure a quorum of N affirmative votes, where N=Size (cluster), including the total combined number of nodes and the cluster witness. The witness vote can be requested and used to satisfy this quorum provided that the candidate first receives a quorum-1 votes from the nodes of the cluster.

After the node 404 identifies itself as a candidate to replace the cluster leader, the node 404 requests votes from all reachable nodes in the cluster (but initially, not the witness). In the present example, the node 402 is unable to communicate with the node 404 due to the network partition fault, and there are no other nodes in the cluster. The candidate node (node 404) casts a vote for itself. In this scenario, a quorum of the three-entity cluster is two, and the single vote therefore constitutes a quorum-1.

In implementations where the server cluster includes other nodes reachable by the node 404 at the time of leader election, the other nodes cast votes in a manner that is, in one implementation, identical to traditional Raft applications (e.g., voting for the candidate provided that the candidate's last metadata log entry has a larger term, or same term but equal or larger index than the last metadata log entry of the candidate candidate).

After the node 404 receives a quorum-1 affirmative votes from the N cluster entities (e.g., in favor of electing the candidate as the new leader), the node 404 then requests a vote from the witness 406. The witness 406 compares its newest metadata log entry 412 to the newest metadata log entry 410 stored by the candidate (e.g., the node 404) to determine whether or not to vote for the candidate. In general, a candidate node (e.g., node 404) receives an affirmative vote from the witness 406 when any one of the following are true:

(1) the candidate's most recent metadata log entry has a larger term than the most recent metadata log entry of the witness;
(2) the candidate's most recent metadata log entry has the same term and a larger subterm than the most recent metadata log entry metadata of the witness; or
(3) the candidate's most recent metadata log entry has the same term and subterm as the most recent metadata log entry of the witness and the quorum-1 affirmative votes that the candidate has already received are all from nodes in replication set of the witness.

If any of the above (1)-(3) is true, the candidate node initiates a write to the witness to record itself as the vote target of the witness. The witness vote is counted once this write is successful.

In the example of FIG. 4B, the newest metadata log entry 410 of the candidate node has the same term and a lower subterm than the newest metadata log entry 412 of the witness. Therefore, none of the above are true and the node 404 does not get the vote of the witness 406 and does not become the new leader. In this scenario, the cluster waits for the leader node to come back online instead of electing a new leader. This ensures data is not lost. If, on the other hand, the node 404 were able to secure the vote from the witness, the node 404 would become the new leader.

Figure 5:
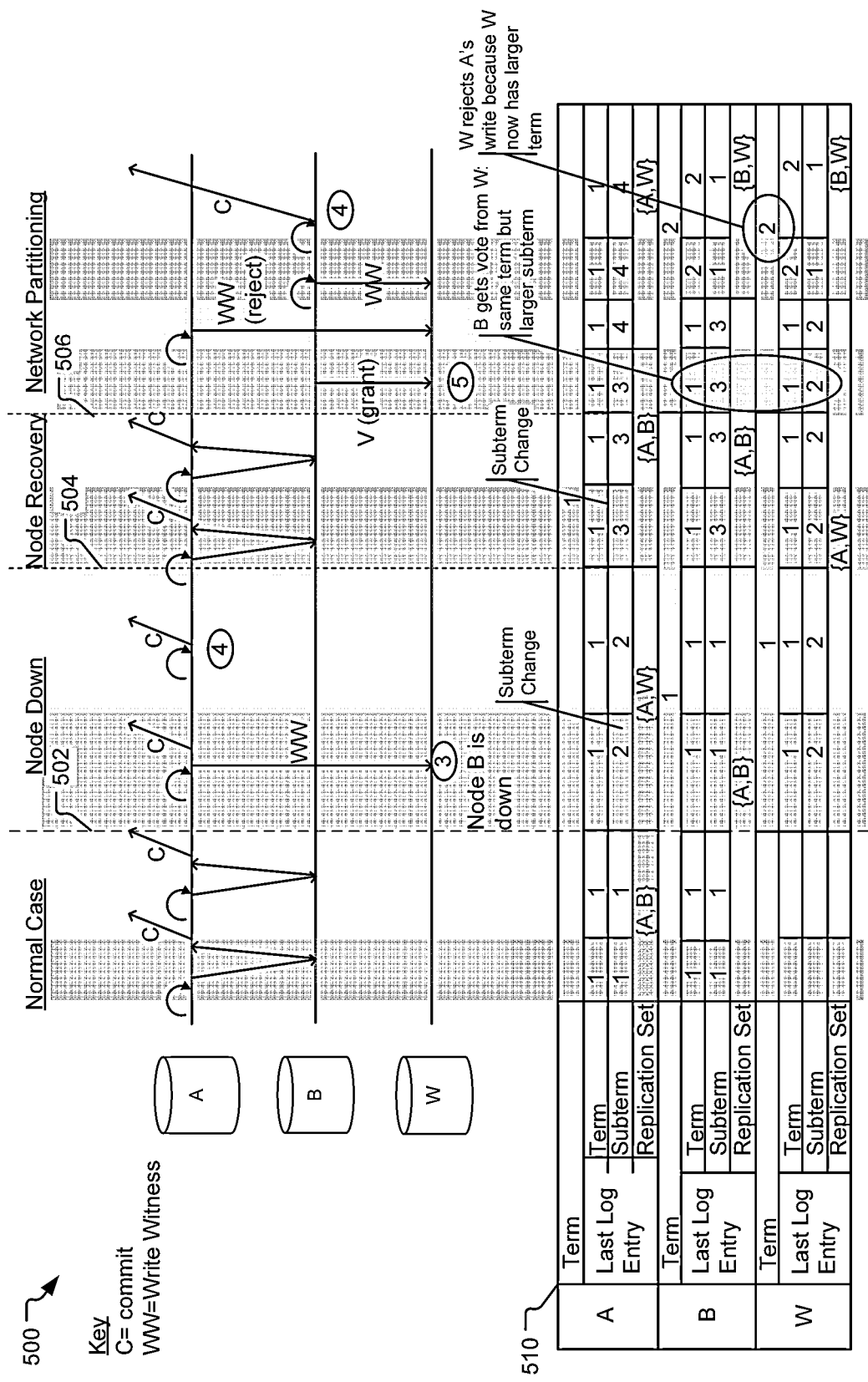
FIG. 5 illustrates example operations in a two-node cluster implementing the disclosed state machine replication system.

FIG. 5 illustrates example operations 500 in a two-node cluster implementing the disclosed state machine replication system. A diagram 514 illustrates example actions occurring within the system in temporal association with the metadata updates reflected in table 510. Specifically, the table 0 illustrates metadata stored at a Node A, Node B and also at a witness (W) in association with each action shown in the diagram 514. A key 518 in the upper left corner defines relevant diagram annotations (e.g., "C" stands for "committal" of a message and "WW" stands for a write to the witness (W), and "V" stands for vote request or grant).

Time increases from left to right across the diagram 514 and actions in the diagram 514 vertically aligned with temporarily corresponding stored metadata shown in the table 510.

The diagram 514 is discussed below with respect to four different sequential time intervals t1, t2, t3, and t4 (all annotated in the diagram 514). The first interval t1 corresponds to a time of normal operations during which both of Nodes A and B remain online and fully operational. Here, Node A is the cluster leader and Node B is a follower node. Each message received at Node A from the client device is replicated to Node B, and committed by Node A in response to a receiving an acknowledgment from Node B, Since Node A is the original leader of the cluster and has been the leader continuously, both nodes store metadata indicating a term of 1. Additionally, both nodes store a subterm of 1, denoting the fact that Nodes A and B have been online and continuously available since the initiation of the cluster. Node A (the leader) stores a replication set that consists of nodes A and B.

Node B goes down (offline) at time 502, commencing the second time interval (t2) illustrated in the diagram 514. When Node A detects that Node B is down, Node A increments the subterm from 1 to 2 as shown by subterm update 508, and updates its replication set to remove Node B and to add the witness (W). These updates are recorded in a metadata log entry of Node A when a message 512 is received. Since Node B remains unreachable, Node A tries to write the message 512 to the witness, as indicated by witness write request 515. The witness write request 515 is granted because the witness is not yet storing any metadata. Node A writes the current term (1) and subterm (2) to the witness and is then permitted to commit the message 512 in response the successful witness write.

When Node B subsequently recovers at time 504, Node A increments the subterm from 2 to 3 (e.g., at the start of the interval t3), as indicated by subterm update 517. The incrementation signifies Node B's availability status change from offline to online. Additionally, Node A updates its replication set to include node B and to again exclude the witness. These updates are replicated in the metadata log stored at node B but not at the witness because the witness is no longer part of the replication set.

At the start of the time interview t4, a network partition event occurs at time 506. Due to the network partition fault, Nodes A and B are unable to communicate with one another but still able to communicate with the witness. Node B declares itself a candidate to become the new cluster leader, and initiates an election process. In the illustrated example, it is assumed that Node B initiates the election process before Node A; however, this could be reversed in other implementations. Node B votes for itself, and this satisfies the quorum-1 of N total cluster entities requirement, allowing node B to then request a vote from the witness ("V"). In this case, the witness responds with an affirmative vote in favor of electing node B because, as indicated by the metadata 520, the newest metadata log entry on the witness has the same term and a lower subterm than that of the candidate.

At this point, Node B has secured affirmative votes from the requisite quorum of N total cluster entities (e.g., itself and the witness, constituting ⅔ cluster entities), and Node B therefore becomes the new leader. When Node B becomes the new leader, the term is updated from 1 to 2 on Node B (as shown by term update 524), and this updated metadata is copied to the witness, as indicated by the witness term change 522.

While Node B was conducting the aforementioned election operations, Node A received a new message 534 and updated its stored subterm from 3 to 4 (to mark the changed availability status of Node B, due to the network partition fault). However, this subterm change from 3 to 4 was not propagated to Node B because the network partition fault is ongoing. Believing itself to still be the rightful leader, Node A attempts to write the message 534 to the witness, as shown by write request 526. The write request 526 is rejected because Node A has a stored term of 1, which is smaller than the witness' stored term of '2.' Consequently, Node A is not permitted to write to the witness and unable to acknowledge the client message. However, Node B then receives the same message 527 from the client and attempts to write to the witness, as shown by witness write request 530. At the time of the write request 530, Node B and the Witness store an identical term, subterm, and replication set (with the witness present in the replication set). Therefore, Node B is permitted to write the message to the witness, and Node B is permitted to commit the message 527 in response to the successful write to the witness.

Figure 6:
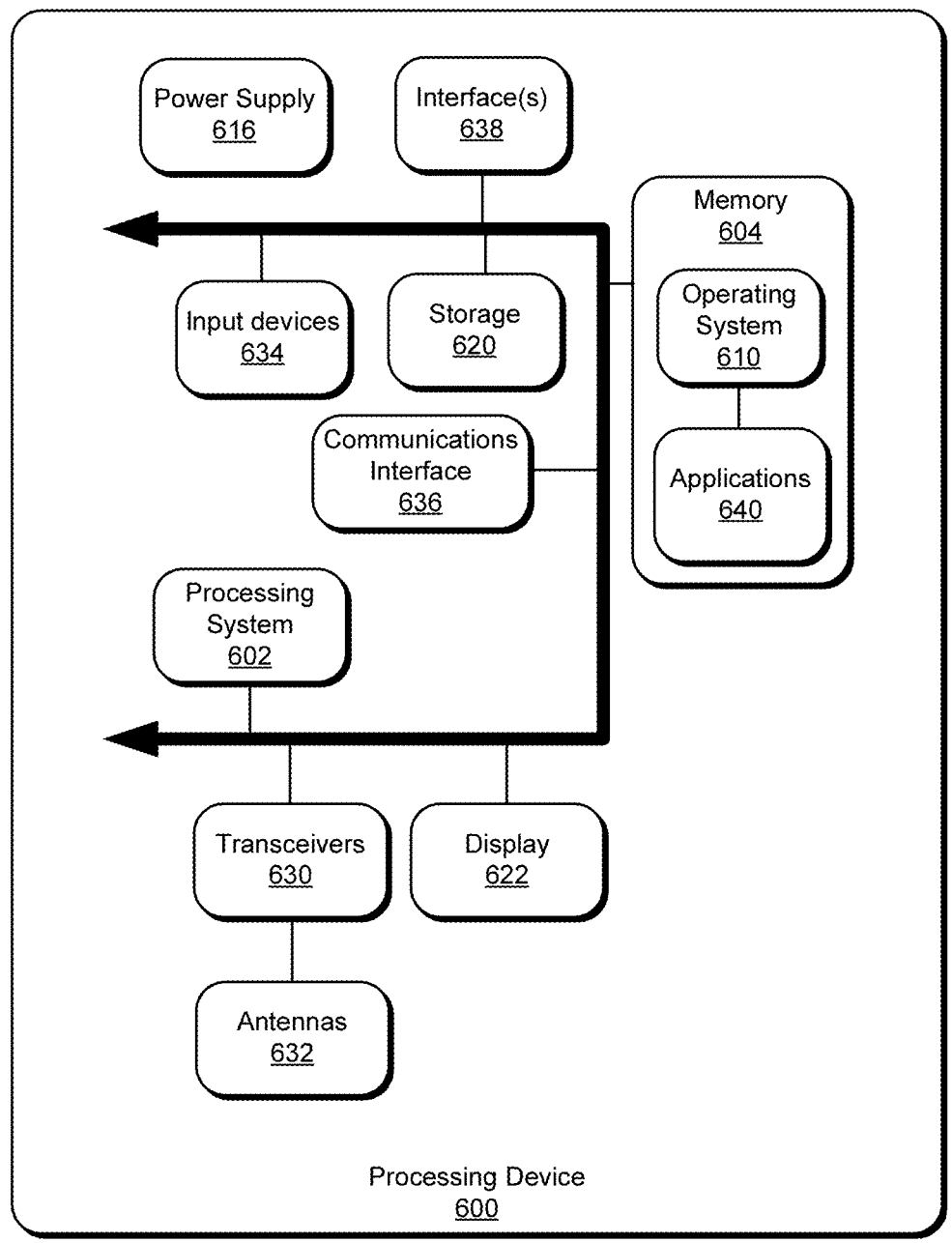
FIG. 6 illustrates an example schematic of a processing device suitable for implementing aspects of the disclosed technology.

FIG. 6 illustrates an example schematic of a processing device 600 suitable for implementing aspects of the disclosed technology. The processing devices 600 includes one or more processor unit(s) 602, memory device(s) 604, a display 606, and other interfaces 608 (e.g., buttons). The processor unit(s) 602 may each include one or more CPUs, GPUs, etc.

The memory device(s) 604 generally includes both volatile memory (e.g., RAM) and non-volatile memory (e.g., flash memory). An operating system 610, such as the Microsoft Windows® operating system, the Microsoft Windows® Phone operating system or a specific operating system designed for a gaming device, may resides in the memory device(s) 604 and be executed by the processor unit(s) 602, although it should be understood that other operating systems may be employed.

One or more applications 612 (e.g., the discloses consensus algorithm logic) are loaded in the memory device(s) 604 and executed on the operating system 610 by the processor unit(s) 602. The applications 612 may receive inputs from one another as well as from various input local devices such as a microphone 634, input accessory 635 (e.g., keypad, mouse, stylus, touchpad, gamepad, racing wheel, joystick), and a camera 632. Additionally, the applications 612 may receive input from one or more remote devices, such as remotely-located smart devices, by communicating with such devices over a wired or wireless network using more communication transceivers 630 and an antenna 638 to provide network connectivity (e.g., a mobile phone network, Wi-Fi®, Bluetooth®). The processing device 600 may also include one or more storage devices 628 (e.g., non-volatile storage). Other configurations may also be employed.

The processing device 600 further includes a power supply 616, which is powered by one or more batteries or other power sources and which provides power to other components of the processing device 600. The power supply 616 may also be connected to an external power source (not shown) that overrides or recharges the built-in batteries or other power sources.

The processing device 600 may include a variety of computer-readable storage media and incomputer-readable communication signals. Tangible computer-readable storage can be embodied by any available media that can be accessed by the processing device 600 and includes both volatile and nonvolatile storage media, removable and non-removable storage media. Tangible computer-readable storage media excludes intangible and transitory communications signals and includes volatile and nonvolatile, removable and non-removable storage media implemented in any method or technology for storage of information such as computer readable instructions, data structures, program modules or other data. Tangible computer-readable storage media includes RAM, ROM, EEPROM, flash memory or other memory technology, CDROM, digital versatile disks (DVD) or other optical disk storage, magnetic cassettes, magnetic tape, magnetic disk storage or other magnetic storage devices, or any other tangible medium which can be used to store the desired information, and which can be accessed by the processing device 600. In contrast to computer-readable storage media, incomputer-readable communication signals may embody computer readable instructions, data structures, program modules or other data resident in a modulated data signal, such as a carrier wave or other signal transport mechanism. The term "modulated data signal" means a signal that has one or more of its characteristics set or changed in such a manner as to encode information in the signal. By way of example, intangible communication signals include wired media such as a wired network or direct-wired connection, and wireless media such as acoustic, RF, infrared and other wireless media.

Some implementations may comprise an article of manufacture. An article of manufacture may comprise a tangible storage medium (a memory device) to store logic. Examples of a storage medium may include one or more types of processor-readable storage media capable of storing electronic data, including volatile memory or non-volatile memory, removable or non-removable memory, erasable or non-erasable memory, writeable or re-writeable memory, and so forth. Examples of the logic may include various software elements, such as software components, programs, applications, computer programs, application programs, system programs, machine programs, operating system software, middleware, firmware, software modules, routines, subroutines, operation segments, methods, procedures, software interfaces, application program interfaces (API), instruction sets, computing code, computer code, code segments, computer code segments, words, values, symbols, or any combination thereof. In one implementation, for example, an article of manufacture may store executable computer program instructions that, when executed by a computer, cause the computer to perform methods and/or operations in accordance with the described implementations. The executable computer program instructions may include any suitable type of code, such as source code, compiled code, interpreted code, executable code, static code, dynamic code, and the like. The executable computer program instructions may be implemented according to a predefined computer language, manner, or syntax, for instructing a computer to perform a certain operation segment. The instructions may be implemented using any suitable high-level, low-level, object-oriented, visual, compiled and/or interpreted programming language.

In some aspects, the techniques described herein relate to a cluster implementing a data replication system with improved fault tolerance, the cluster including: a witness including persistent data storage; and multiple nodes configured to selectively execute leader node operations when serving as a leader of the cluster, the leader node operations including: receiving messages from a client application and replicating the received messages to follower nodes of the cluster; in response detecting an availability status change for one of the follower nodes of the multiple nodes: incrementing a subterm identifying a total number of availability status changes detected within the cluster over a given time interval; and updating a replication set to replace the follower node with the witness, the replication set identifying a set of entities designated to provide acknowledgments counted when determining whether to commit a message following message replication; and writing the replication set and the subterm to the witness in response to receiving a first client message from a client application following the availability status change.

In some aspects, the techniques described herein relate to a cluster, wherein the replication set and metadata are written to the witness further in response to confirming receipt of the first client message by at least a quorum minus one of entities included in the replication set.

In some aspects, the techniques described herein relate to a cluster, wherein the leader node operations further include committing the first client message in response to confirming successful write of the replication set and the subterm to the witness, wherein committing the first client message includes executing one or more commands included in the first client message.

In some aspects, the techniques described herein relate to a cluster, wherein the leader node operations further include: transmitting, to each reachable node of the multiple nodes, the first client message along with metadata including the subterm and a term identifying a number of times elects a new leader over the given time interval.

In some aspects, the techniques described herein relate to a cluster, wherein the witness receives the replication set and the subterm but does not receive or store the first client message.

In some aspects, the techniques described herein relate to a cluster, wherein the leader node operations further include: following transmission of the replication set and the subterm to the witness, ceasing further writes to the witness until a next incrementation of the subterm.

In some aspects, the techniques described herein relate to a cluster, wherein the multiple nodes are further configured to execute candidate operations in response to determining that the leader of the cluster is unavailable, the candidate operations including: declaring candidacy to replace the leader by requesting votes from other nodes of the cluster; in response to receiving affirmative votes from one fewer than a quorum of a total number of nodes in the cluster, requesting a vote from the witness; and replacing the leader in response to receiving an affirmative vote from the witness.

In some aspects, the techniques described herein relate to a cluster, wherein the affirmative vote of the witness is considered received in response to satisfaction of one or more criteria from a list of criteria including: a most recent locally-stored metadata log entry has a larger term than a most recent metadata log entry of the witness; the most recent locally-stored metadata log entry has a same term and larger subterm than the most recent metadata log entry of the witness; or the most recent locally-stored metadata log entry has a same term and subterm as the most recent metadata log entry of the witness and the affirmative votes received are all from nodes included in a most recent version of the replication set written to the witness.

In some aspects, the techniques described herein relate to a cluster, wherein the witness includes shared storage that supports atomic creation of hard links, and wherein the witness does not include executable logic.

In some aspects, the techniques described herein relate to a tangible computer-readable storage media storing processor-executable instructions for implementing a computer process for performing data replication in a multi-node cluster, the computer process including: at a node elected as leader of the multi-node cluster, performing a set of leader node operations including: detecting an availability status change for a first follower node within the multi-node cluster; in response to the availability status change: incrementing a subterm identifying a total number of availability status changes detected within the multi-node cluster over a given time interval; and updating a replication set to replace the first follower node with a witness, the replication set identifying a set of entities designated to provide acknowledgments counted toward a threshold number of acknowledgements required to commit a message following message replication; and in response to receiving a first client message from a client application following detection of the availability status change, writing data to the witness, the data including the replication set, the subterm, and a term identifying a number of times a new leader has been elected over the given time interval.

In some aspects, the techniques described herein relate to a tangible computer-readable storage media, wherein the set of leader node operations further includes: transmitting, to each other available node in the multi-node cluster, the first client message along with metadata including the subterm and the term.

In some aspects, the techniques described herein relate to a tangible computer-readable storage media, wherein the data is written to the witness in response to confirming receipt of the first client message by at least a quorum minus one of total entities included in the replication set.

In some aspects, the techniques described herein relate to a tangible computer-readable storage media, wherein the witness receives the replication set, the subterm, and the term but does not receive or store the first client message.

In some aspects, the techniques described herein relate to a tangible computer-readable storage media, wherein the set of leader node operations further includes executing one or more commands included in the first client message in response to confirming successful write of the data to the witness.

In some aspects, the techniques described herein relate to a tangible computer-readable storage media, wherein the computer process further includes: response to determining that the leader of the multi-node cluster is unavailable, soliciting, by a candidate node of the cluster, votes in favor of electing the candidate node to replace the leader; in response to receiving the votes in favor of electing the candidate node from one fewer than a quorum of a total number of nodes in the multi-node cluster, requesting a vote from the witness; and replacing the leader in response to receiving an affirmative vote from the witness.

In some aspects, the techniques described herein relate to a tangible computer-readable storage media, wherein the affirmative vote of the witness is considered received when one or more criteria is satisfied from a list of criteria including: a most recent metadata log entry of the candidate node has a larger term than a most recent metadata log entry of the witness; the most recent metadata log entry of the candidate node has a same term and larger subterm than the most recent metadata log entry of the witness; or the most recent metadata log entry of the candidate node has a same term and subterm as the most recent metadata log entry of the witness and the votes in favor of electing the candidate node are all from nodes included in a most recent version of the replication set written to the witness.

In some aspects, the techniques described herein relate to a tangible computer-readable storage media, wherein the witness resides includes shared storage that supports atomic creation of hard links, and wherein the witness does not include executable logic.

In some aspects, the techniques described herein relate to a fault-tolerant method of replicating data from a client application in a cluster of compute devices, the fault-tolerant method including: at a node elected as leader of the cluster of compute devices, performing a set of leader node operations including: in response detecting an availability status change for a first follower node within the cluster of compute devices: incrementing a subterm identifying a total number of availability status changes detected within the cluster of compute devices over a given time interval; and updating a replication set to replace the first follower node with a witness that includes persistent data storage and that lacks compute logic, the replication set identifying a set of entities designated to provide acknowledgments counted toward a threshold number of acknowledgements required to commit a message following message replication; and in response to receiving a first client message from a client application following the availability status change, writing data to the witness that includes the replication set, the subterm, and a term identifying a number of times a new leader has been elected over the given time interval.

In some aspects, the techniques described herein relate to a fault-tolerant method, wherein the fault-tolerant method further includes: performing, by a candidate node, candidate operations in response to determining that the leader of the cluster of compute devices is unavailable, the candidate operations including: soliciting votes in favor of electing the candidate node to replace the leader; in response to receiving the votes in favor of electing the candidate node from one fewer than a quorum of a total number of nodes in the cluster of compute devices, comparing a most recent metadata log entry of the candidate node to the most recent metadata log entry stored on the witness; and electing the candidate node as the leader in response to determining either that the most recent metadata log entry of the candidate node has a larger term than a most recent metadata log entry of the witness or that the most recent metadata log entry of the candidate node has a same term and larger subterm than the most recent metadata log entry of the witness.

In some aspects, the techniques described herein relate to a fault-tolerant method, wherein the fault-tolerant method further includes: electing the candidate node as the leader in response to determining that the most recent metadata log entry of the candidate node has a same term and subterm as the most recent metadata log entry of the witness and that all of the votes in favor of electing the candidate node are from nodes included in a most recent version of the replication set written to the witness.

The logical operations described herein are implemented as logical steps in one or more computer systems. The logical operations may be implemented (1) as a sequence of processor-implemented steps executing in one or more computer systems and (2) as interconnected machine or circuit modules within one or more computer systems. The implementation is a matter of choice, dependent on the performance requirements of the computer system being utilized. Accordingly, the logical operations making up the implementations described herein are referred to variously as operations, steps, objects, or modules. Furthermore, it should be understood that logical operations may be performed in any order, unless explicitly claimed otherwise or a specific order is inherently necessitated by the claim language. The above specification, examples, and data, together with the attached appendices, provide a complete description of the structure and use of example implementations.

What is claimed is:

1. A cluster implementing a data replication system with improved fault tolerance, the cluster comprising:

a witness comprising persistent data storage; and multiple nodes that each comprise instructions stored in memory executable by a processing system to selectively execute leader node operations when serving as a leader of the cluster, the leader node operations comprising:
receiving messages from a client application and replicating the received messages to follower nodes of the cluster;
in response detecting an availability status change for one of the follower nodes of the multiple nodes:
incrementing a subterm identifying a total number of availability status changes detected within the cluster over a given time interval; and
updating a replication set to replace the follower node with the witness, the replication set identifying a set of entities designated to provide acknowledgments counted when determining whether to commit a message following message replication; and
writing the replication set and the subterm to the witness in response to receiving a first client message from a client application following the availability status change.

2. The cluster of claim 1, wherein the replication set and metadata are written to the witness further in response to confirming receipt of the first client message by at least a quorum minus one of entities included in the replication set.

3. The cluster of claim 1, wherein the leader node operations further include committing the first client message in response to confirming successful write of the replication set and the subterm to the witness, wherein committing the first client message includes executing one or more commands included in the first client message.

4. The cluster of claim 1, wherein the leader node operations further include:
transmitting, to each reachable node of the multiple nodes, the first client message along with metadata including the subterm and a term identifying a number of times elects a new leader over the given time interval.

5. The cluster of claim 1, wherein the witness receives the replication set and the subterm but does not receive or store the first client message.

6. The cluster of claim 1, wherein the leader node operations further include:
following transmission of the replication set and the subterm to the witness, ceasing further writes to the witness until a next incrementation of the subterm.

7. The cluster of claim 1, wherein the multiple nodes are further configured to execute candidate operations in response to determining that the leader of the cluster is unavailable, the candidate operations including:
declaring candidacy to replace the leader by requesting votes from other nodes of the cluster;
in response to receiving affirmative votes from one fewer than a quorum of a total number of nodes in the cluster, requesting a vote from the witness; and
replacing the leader in response to receiving an affirmative vote from the witness.

8. The cluster of claim 7, wherein the affirmative vote of the witness is considered received in response to satisfaction of one or more criteria from a list of criteria comprising:
a most recent locally-stored metadata log entry has a larger term than a most recent metadata log entry of the witness;
the most recent locally-stored metadata log entry has a same term and larger subterm than the most recent metadata log entry of the witness; or
the most recent locally-stored metadata log entry has a same term and subterm as the most recent metadata log entry of the witness and the affirmative votes received are all from nodes included in a most recent version of the replication set written to the witness.

9. The cluster of claim 1, wherein the witness includes shared storage that supports atomic creation of hard links, and wherein the witness does not include executable logic.

10. A non-transitory computer-readable storage media storing processor-executable instructions for implementing a computer process for performing data replication in a multi-node cluster, the computer process comprising:
at a node elected as leader of the multi-node cluster, performing a set of leader node operations comprising:
detecting an availability status change for a first follower node within the multi-node cluster;
in response to the availability status change:
incrementing a subterm identifying a total number of availability status changes detected within the multi-node cluster over a given time interval; and
updating a replication set to replace the first follower node with a witness, the replication set identifying a set of entities designated to provide acknowledgments counted toward a threshold number of acknowledgements required to commit a message following message replication; and
in response to receiving a first client message from a client application following detection of the availability status change, writing data to the witness, the data including the replication set, the subterm, and a term identifying a number of times a new leader has been elected over the given time interval.

11. The non-transitory computer-readable storage media of claim 10, wherein the set of leader node operations further comprises:
transmitting, to each other available node in the multi-node cluster, the first client message along with metadata including the subterm and the term.

12. The non-transitory computer-readable storage media of claim 10, wherein the data is written to the witness in response to confirming receipt of the first client message by at least a quorum minus one of total entities included in the replication set.

13. The non-transitory computer-readable storage media of claim 10, wherein the witness receives the replication set, the subterm, and the term but does not receive or store the first client message.

14. The non-transitory computer-readable storage media of claim 10, wherein the set of leader node operations further comprises executing one or more commands included in the first client message in response to confirming successful write of the data to the witness.

15. The non-transitory computer-readable storage media of claim 10, wherein the computer process further includes:
response to determining that the leader of the multi-node cluster is unavailable, soliciting, by a candidate node of the cluster, votes in favor of electing the candidate node to replace the leader;
in response to receiving the votes in favor of electing the candidate node from one fewer than a quorum of a total number of nodes in the multi-node cluster, requesting a vote from the witness; and
replacing the leader in response to receiving an affirmative vote from the witness.

16. The non-transitory computer-readable storage media of claim 15, wherein the affirmative vote of the witness is considered received when one or more criteria is satisfied from a list of criteria comprising:
- a most recent metadata log entry of the candidate node has a larger term than a most recent metadata log entry of the witness;
- the most recent metadata log entry of the candidate node has a same term and larger subterm than the most recent metadata log entry of the witness; or
- the most recent metadata log entry of the candidate node has a same term and subterm as the most recent metadata log entry of the witness and the votes in favor of electing the candidate node are all from nodes included in a most recent version of the replication set written to the witness.

17. The non-transitory computer-readable storage media of claim 10, wherein the witness resides includes shared storage that supports atomic creation of hard links, and wherein the witness does not include executable logic.

18. A fault-tolerant method of replicating data from a client application in a cluster of compute devices, the fault-tolerant method comprising:
- at a node elected as leader of the cluster of compute devices, performing a set of leader node operations comprising:
- in response detecting an availability status change for a first follower node within the cluster of compute devices:
  - incrementing a subterm identifying a total number of availability status changes detected within the cluster of compute devices over a given time interval; and
  - updating a replication set to replace the first follower node with a witness that includes persistent data storage and that lacks compute logic, the replication set identifying a set of entities designated to provide acknowledgments counted toward a threshold number of acknowledgements required to commit a message following message replication; and
- in response to receiving a first client message from a client application following the availability status change, writing data to the witness that includes the replication set, the subterm, and a term identifying a number of times a new leader has been elected over the given time interval.

19. The fault-tolerant method of claim 18, wherein the fault-tolerant method further comprises:
- performing, by a candidate node, candidate operations in response to determining that the leader of the cluster of compute devices is unavailable, the candidate operations comprising:
- soliciting votes in favor of electing the candidate node to replace the leader;
- in response to receiving the votes in favor of electing the candidate node from one fewer than a quorum of a total number of nodes in the cluster of compute devices, comparing a most recent metadata log entry of the candidate node to the most recent metadata log entry stored on the witness; and
- electing the candidate node as the leader in response to determining either that the most recent metadata log entry of the candidate node has a larger term than a most recent metadata log entry of the witness or that the most recent metadata log entry of the candidate node has a same term and larger subterm than the most recent metadata log entry of the witness.

20. The fault-tolerant method of claim 19, wherein the fault-tolerant method further comprises:
- electing the candidate node as the leader in response to determining that the most recent metadata log entry of the candidate node has a same term and subterm as the most recent metadata log entry of the witness and that all of the votes in favor of electing the candidate node are from nodes included in a most recent version of the replication set written to the witness.

* * * * *